United States Patent [19]
Karwacki et al.

[11] Patent Number: 5,569,151
[45] Date of Patent: Oct. 29, 1996

[54] HANDLING AND DELIVERY SYSTEM FOR DANGEROUS GASES

[75] Inventors: Eugene J. Karwacki, Orefield; Arron D. Varn, Macungie; Howard P. Withers, Jr., Breinigsville; Andrew J. Woytek, Allentown, all of Pa.

[73] Assignee: Air Products and Chemicals, Inc., Allentown, Pa.

[21] Appl. No.: 435,077

[22] Filed: May 8, 1995

[51] Int. Cl.⁶ ........................................... A62D 3/00
[52] U.S. Cl. ........................................ 588/249; 137/264
[58] Field of Search .................... 588/249, 259; 405/128; 137/264; 220/422

[56] References Cited

U.S. PATENT DOCUMENTS

| | | | |
|---|---|---|---|
| 55,039 | 5/1866 | Baldwin. | |
| 2,552,783 | 5/1951 | Harper | 62/1 |
| 2,831,607 | 4/1958 | Berndt | 222/3 |
| 3,724,712 | 4/1973 | Starr | 220/63 R |
| 3,820,309 | 6/1974 | Cullen | 55/387 |
| 4,109,828 | 8/1978 | Stewart | 222/3 |
| 4,243,155 | 1/1981 | Stewart | 222/3 |
| 4,376,489 | 3/1983 | Clemens | 137/264 X |
| 4,629,611 | 12/1986 | Fan | 423/240 |
| 4,788,973 | 12/1988 | Kirchgeorg | 128/214.18 |
| 4,872,553 | 10/1989 | Suzuki | 206/524.4 |
| 5,333,641 | 8/1994 | Cota et al. | 137/264 |

*Primary Examiner*—William P. Neuder
*Attorney, Agent, or Firm*—Geoffrey L. Chase

[57] ABSTRACT

Method and apparatus to contain dangerous gases venting or leaking from a primary containment vessel. An outer containment vessel holds the primary containment vessel in fluid tight relationship to the outer vessel. The outer vessel has an internal volume large enough to contain the entire contents of the inner vessel and includes means to absorb or scrub gas leaking from the inner vessel. Removal of gas from the inner vessel to a point of use is controlled by valves and conduits contained in the outer vessel, the valves being controlled from outside the vessels.

10 Claims, 1 Drawing Sheet

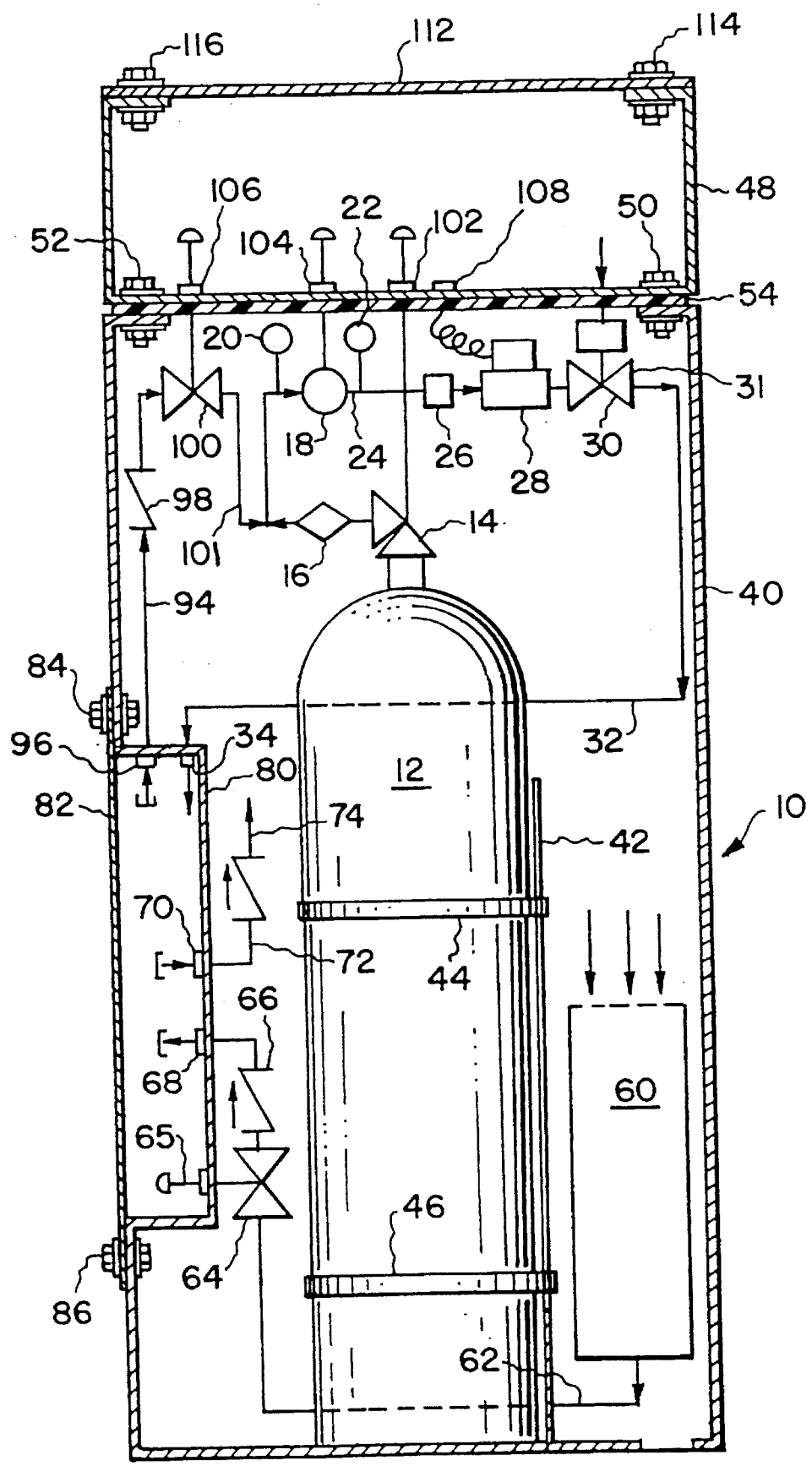

HANDLING AND DELIVERY SYSTEM FOR DANGEROUS GASES

TECHNICAL FIELD OF THE INVENTION

The present invention pertains to safe handling of dangerous gases contained in pressurized cylinders.

BACKGROUND OF THE INVENTION

Numerous industrial processes require the use of gases which are considered dangerous because they are highly flammable, corrosive or toxic.

For example, excimer lasers require dangerous gases such as fluorine and hydrogen chloride for normal laser operation. These gases are a problem for the laser user because of their characteristics. In addition, excimer lasers suffer from a problem in regard to the inability of the operator to operate the laser with constant power output at a constant discharge voltage, while maintaining a good beam profile because of the inability to maintain a stable halogen concentration.

One method of handling dangerous gases of the type used for excimer lasers is by using dilute mixtures of the dangerous gas with a laser buffer gas, e.g. five percent or less halogen gas (e.g. fluorine or hydrogen chloride) in a buffer gas (e.g. helium, neon or mixtures thereof). This mixture is introduced into the laser with another rare gas component, e.g. argon, xenon or krypton. Using dilute mixtures of the dangerous gas and the buffer gas requires a high pressure cylinder (typically 1,000 to 2,000 psig) in order to provide enough halogen to operate the excimer laser for acceptable periods of time. Certain potential users of excimer lasers have decided not to use this type of equipment because of the necessity for handling dangerous gases which are susceptible to leakage when stored and delivered using conventional gas handling technology.

As the laser operates, fluorine is lost from the mixture and thus fluorine must be replenished. A common practice called "boosting", is a process, in which a small amount of the dilute fluorine/buffer gas mixture is added to the laser to make up for the depletion of fluorine that occurs during normal operation. This method can only be used for a given number of cycles after which the gas composition has been so altered the laser will not operate satisfactorily. The gas charge must then be vented and the laser re-charged with a new gas mixture, resulting in unwanted downtime and increased gas expenditures.

Recently a method has been developed as an alternative to use of high pressure gases by utilizing a gas generator. Undiluted fluorine gas is generated by heating a solid metal fluoride powder which is known to evolve fluorine when heated and is added to the laser by circulating the laser gas over or through the solid. This method overcomes the problem of buffer gas dilution but suffers from other aperational difficulties. Such a device must be operated at high temperatures, e.g. 250°–300° C., to generate sufficient quantities of fluorine thus causing safety and corrosion problems because of the handling of fluorine at high temperatures. Also dust from the metal fluoride powder is a problem since it must be prevented from entering the laser gas and fouling the laser optical system. In such a system when the metal fluoride is depleted of fluorine it must be regenerated with gaseous fluorine at high temperature and pressure which means the removal of the source from the system and returned to the supplier for regeneration. Experience has shown that because of the number of regenerations of a particular charge of metal fluoride required to have enough available fluorine, this may result in unacceptable costs associated with the fluorine generator.

SUMMARY OF THE INVENTION

The present invention provides a method and apparatus for storing and dispensing a dangerous gas by enclosing a primary container, e.g. cylinder or inner cylinder, of the dangerous gas inside a fluid tight housing (outer vessel) so that should the contents of the cylinder leak the gas leaking from the cylinder will be contained in the outer vessel. The outer vessel is provided with a system for venting the outer vessel through an absorbent or reactive scrubber that will prevent dangerous gas from being released from the container if there is leak from the cylinder or any associated piping contained in the outer container or vessel. This venting system also serves as a pressure relief device for the outer vessel thus preventing any significant pressure build up in the outer vessel and making the design of the outer vessel less complex with regards to pressure containment. The outer vessel is adapted to permit remotely controlled withdrawal of the dangerous gas through conduits either directly or pre-mixed with a diluent gas prior to exiting the outer vessel through suitable fittings. According to the invention, dangerous gases can be contained in the inner cylinder at low pressures because they do not have to be diluted with a diluent or buffer gas.

BRIEF DESCRIPTION OF THE DRAWING

The single FIGURE of the drawing is a cross sectional schematic representation of a system according to the present invention.

DETAILED DESCRIPTION OF THE INVENTION

The present invention addresses the safe handling and delivery of dangerous gases. The method and apparatus of the present invention are applicable to all of the dangerous gases currently used in research and development and industrial applications.

A particular problem addressed by the method and apparatus of the present invention is the safe handling and delivery of fluorine gas for use in an excimer laser. As shown in the drawing the system of the invention shown generally as 10 comprises an inner vessel or cylinder 12 that is approved by the Department of Transportation for storing and delivering fluorine gas at pressures up to 400 psig. Cylinder 12 includes a cylinder valve 14 for delivery of the fluorine through a flow limiting device 16 to a pressure regulator 18 of the type that is approved for handling a dangerous gas such as fluorine. The delivery system includes a first pressure gauge 20 and a second pressure gauge 22 for measuring the cylinder and delivery pressures of the gas withdrawn from the cylinder 12. Gauges 20,22 can be electronic pressure measuring devices (transducers) with gas tight electrical signal connectors as discussed below in relation to fitting 108. From the delivery side 24 of regulator 18 the fluorine can be conducted through a filter 26 then through an electronic flow meter, preferably a mass flow controller, 28 through a shut off valve 30 then via conduit 32 to a fitting 34 which can be used to connect the gas source to the excimer laser device. The cylinder 12 and the associated regulators and valves are contained in an outer containment vessel or secondary gas tight housing 40 which is of a volume so that any gas leaking from cylinder 12 or the associated piping will fill the vessel 40 without a significant increase in internal pressure in the vessel 40. Furthermore, significant pressure increases in vessel 40 are prevented by a venting system described below. Vessel 40 has a bracket 42 and straps 44, 46 to position the cylinder 12 to prevent movement of the cylinder 12 inside of the vessel 40. Vessel 40 is adapted to receive a top section 48 which is in the shape of an open top pan which is adapted to be mounted on the top of vessel 40 via a series of bolts 50, 52 and to close the top of vessel 40 by means of a sealing gasket 54.

Vessel 40 contains an integrated venting/scrubber system 60 which is connected via conduit 62 to a control valve 64, a check valve 66, and an outlet fitting 68 so that gas can be withdrawn from the interior of the vessel 40 through the scrubber 60 to a ventilating or other gas treatment facility. Alternatively, scrubber 60 can be an absorber system that will absorb the dangerous gas. Maintaining valve 64 in an open position prevents any significant pressure buildup in vessel 40. Dangerous gas will hot be released because of its removal as it passes through the absorber/scrubber 60. Inlet fitting 70 is connected via conduit 72 and check valve 74 to the interior of vessel 40 so that a purge gas can be introduced into the interior of vessel 40 to aid in removal of gas contained inside the vessel 40. Fittings 70, 68 and a valve stem 65 for valve 64 are mounted in a recess 80 in vessel 40, recess 80 being closed by a shipping cover 82 fastened by suitable fasteners 84, 86 such as threaded bolts. Fittings 70, 68 and valve stem 65 are sealed in a gas tight relation in housing recess 80 by suitable gasketing as is well known in the art. Recess 80 also contains outlet fitting 34 for delivery of the dangerous gas contained in the cylinder 12.

Conduit 94 extends between an inlet fitting 96 in recess 80 to a check valve 98 and from there to a control valve 100 so that an inert gas may be introduced via conduit 101 into the gas withdrawn from cylinder 12. Conduit 94 can also be used to fill cylinder 12 without removal from vessel 40.

Regulator 18 and valves 14 and 100 are fitted with stems that extend through gas tight fittings 102, 104 and 106 respectively so that the valves can be controlled when the cylinder 12 is contained in vessel 40 and the gas is being withdrawn from the cylinder 12. Top 48 includes a gas tight fitting 108 for connecting suitable controls to the mass flow control valve 28 and a gas tight fitting 110 for access to control valve 30. Control valve 30 can be an air operated valve that requires air pressure in order to open the valve and serves as a further safety device. Valve 100 can also be an air operated valve. Top 48 can be closed with a removable shipping cover 112 which can be secured by bolts 114, 116 to protect the valve stems and prevent dirt from entering the top 48 during shipping of the system.

In using the system of the invention for a fluorine based excimer laser cylinder 12 is filled with fluorine gas under approximately 125 psig pressure. This pressure was chosen based on the preferred size of the apparatus and a useful amount of fluorine required for this application. The entire system with the cylinder 12 installed in the secondary container 40 with the top 48 end covers 82 and 112 replaced can then be shipped to a point of use.

When a customer receives the system 10 covers 82 and 112 are removed and suitable connections are made to the laser via outlet fitting 34 and if necessary, a diluent gas is connected via fitting 96. Valve 30 is opened by connecting the actuator (operator) to a source of air pressure which is usually regulated through an instrument system used in association with the laser which is well known in the art. Precise control of the fluorine gas is achieved by means of mass flow controller 28 which is connected to the laser controller as is also known in the art.

Should any of the fluorine leak from the cylinder 12 or the associated piping or valves, it will be collected inside of the secondary container 40 and removed via the absorber or scrubber 60. Positive movement of leakage gas through the absorber or scrubber 60 can be achieved by introducing an inert gas or air into the vessel 40 via fitting 70 and check valve 74. The inert gas or air can be circulated through the system by positive evacuation through fitting 68 by opening valve 64 to force the ventilation or purging of the interior of vessel 40.

The piping and associated valves of the delivery system for the fluorine gas can be purged by introducing an inert gas such as helium or buffer gas through fitting 96 and check valve 98 to control valve 100 or by evacuation using a vacuum pump through fitting 34.

As set out above, the purge gas introduced into the secondary container or outer containment vessel 40 must exit by going through the absorbing or scrubbing system 60 so that any gas leaking from cylinder 12 or the manifolds or associated piping will be carried into the absorber/scrubber and contained. The scrubbing and/or absorbing material can be any substance that is known to react readily and completely with fluorine without generating other hazards or hazardous products. Preferably it is a metal oxide such as calcium oxide or aluminum oxide which generate only solid metal fluoride and gaseous oxygen as the products of reaction. The scrubbing system 60 can be contained in any of the metals mentioned below but is preferably made of aluminum to minimize weight and to provide high heat transfer for the scrubbing reaction.

It is preferable that the components on the high pressure side of the delivery system be manufactured from a nickel base alloy such as Monel 400. However, at cylinder pressures of approximately 125 psig these components can also be made of standard materials known to be compatible with fluorine at ambient temperatures such as stainless steel, brass or copper. The lower pressure side of the pressure controlling device can have components made of any of the foregoing described metals. Polymeric and fluoropolymeric materials should not be used in valve seats and O-rings. Valves and orifices should be made of metallic or ceramic materials.

The outer containment vessel 40, top 48, and covers 82 and 112 are preferably made of aluminum to minimize weight. Aluminum is compatible with fluorine up to several hundred degrees. No materials should be used within the vessel 40 that can react violently with fluorine such as non-fluorinated organic polymers. Gasket seal 54 connecting the top 48 and vessel 40 should be a chlorofluorocarbon or perfluorocarbon elastomer.

The system according to the present invention is a significant improvement over the prior art used to solve the two main problems with excimer laser operation, namely; (1) the inability to operate the laser with constant power output at a constant discharge voltage while maintaining a good beam profile and (2) the special precautions needed to handle the high pressure cylinders of dangerous gases such as fluorine and hydrogen chloride needed for laser operation. With the system of the present invention, the laser can operate with constant power output, beam profile and discharge voltage because fluorine can be added to the laser with precise control. This solves the first problem of laser operation and does so more effectively than the use of "boosting" or a gas generator. The buffer gas dilution problem is eliminated because only fluorine is added to the laser gas chamber. The use of high pressure gas containing fluorine is not required because the fluorine is not diluted with buffer gas. The pressure of the fluorine source gas is approximately 125 psig instead of 1000 to 2000 psig with the same amount of fluorine being available if the cylinders are of the same size, thus improving the safety of the gas supply. Cyclic power output achieved by the boosting method is eliminated by the precise controlled addition of pure fluorine.

The present invention has several advantages when compared to other systems, which address the aforementioned requirements for excimer laser the use of a gas generator. First, the system of the present invention operates at room temperature with no corrosion and safety issues encountered with using a gas generator which operates at 250 ° to 300° C. Second, there is no metal fluoride dust to deal with that might foul the laser optics or other components within the laser. Third, the present invention eliminates problems of impurities in the fluorine gas that can occur from a fluorine generator. Fourth, the present invention utilizes well understood techniques and the cost to operate is easily determined. This compares to the cost when using a gas generator which is known to lack an acceptable number of cycles to qustify the operating costs of the gas generating systems. In addition, the cost of metal fluoride powder is much higher than the cost of fluorine gas.

The present invention has demonstrated laser operation with constant power output, beam profile and discharge voltage.

The present invention addresses the problems of handling a dangerous gas such as fluorine at high pressure. With the system of the present invention, high pressures in the fluorine cylinders have been reduced significantly. The use of a low pressure cylinder of fluorine with a secondary container having an integral scrubber and or absorber has made the handling of the fluorine extremely safe and cost effective.

In addition to the example described above the method and apparatus of the invention can be used to handle any dangerous gas. For example, arsine, phosphine, diborane and others that are used in the manufacture of electronic devices.

The present invention enhances the ability to safely transport dangerous gases.

Having thus described our invention what is desired to be secured by Letters Patent of the United States is set forth in the appended claims.

What is claimed:

1. A system for handling and delivering dangerous gases comprising in combination:

an outer containment vessel having a removable fluid tight cover and adapted to removably hold an inner vessel containing a volume of dangerous gas under pressure, said containment vessel having an internal volume sufficient to contain the volume of dangerous gas contained in said inner vessel without a significant increase in pressure should said dangerous gas discharge from said inner vessel;

said inner vessel having a withdrawal valve to permit removing said gas from said inner vessel;

means on said outer containment vessel to control removal of gas from said inner vessel;

means in said outer containment vessel to absorb/scrub gas escaping from said inner vessel, said means including venting or evacuation of said outer vessel through said means to absorb/scrub said gas; and means to purge said outer containment vessel.

2. A system according to claim 1 wherein there is included means to blend said dangerous gas with a diluent inside said outer containment vessel, said means having a stem that extends through said outer containment vessel in a gas tight fitting.

3. A system according to claim 1 including means to filter said gas as it is withdrawn from said inner vessel.

4. A system according to claim 1 including means to prevent withdrawal of gas from said inner vessel, said means including a fluid pressure activated valve.

5. A system according to claim 1 including a check valve in said means to control removal of said dangerous gas from said inner vessel.

6. A system according to claim 1 including electrical means to measure and control the amount of gas as it is withdrawn from said inner vessel.

7. A system according to claim 1 including a recess in an outer wall of said outer vessel containing valve operators and ports associated with said means to absorb/scrub gas and said purge means and a cover to close said recess.

8. A method of storing and delivering a dangerous gas comprising the steps of enclosing a container of said dangerous gas in a containment volume of a size to physically contain the entire contents of said container should a leak occur; and withdrawing said dangerous gas leaking into said containment volume through an absorber or scrubbing system.

9. A method according to claim 8 including the steps of withdrawing said dangerous gas through a port contained in a wall of said containment vessel.

10. A method according to claim 8 including the steps of monitoring and controlling withdrawal of said dangerous gas as it is withdrawn from said container and conducted to a point of use.

\* \* \* \* \*